(12) United States Patent
Silverstein

(10) Patent No.: US 6,970,156 B1
(45) Date of Patent: Nov. 29, 2005

(54) COLLAPSIBLE COMPUTER MOUSE

(75) Inventor: D. Amnon Silverstein, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 752 days.

(21) Appl. No.: 09/597,960

(22) Filed: Jun. 20, 2000

(51) Int. Cl.[7] ............................................. G09G 5/08
(52) U.S. Cl. ..................... 345/163; 345/156; 345/166
(58) Field of Search ................................ 345/156–158, 345/163–169; D14/402–410, 432; 248/118, 248/118.1, 118.3, 118.5; 361/683, 686; 382/124

(56) References Cited

U.S. PATENT DOCUMENTS

| | | | | |
|---|---|---|---|---|
| 5,490,039 | A | * | 2/1996 | Helms ........................ 361/683 |
| 5,822,230 | A | * | 10/1998 | Kikinis et al. ............ 364/708.1 |
| 5,822,692 | A | * | 10/1998 | Krishan et al. .............. 455/419 |
| 5,886,686 | A | * | 3/1999 | Chen .......................... 345/168 |
| 5,920,306 | A | * | 7/1999 | Kikinis ....................... 345/158 |
| 6,016,138 | A | | 1/2000 | Harskamp et al. |
| 6,040,539 | A | * | 3/2000 | Hiegel ..................... 200/302.1 |
| 6,055,592 | A | * | 4/2000 | Smith .......................... 710/73 |
| 6,205,021 | B1 | * | 3/2001 | Klein et al. .................. 361/383 |
| 6,219,037 | B1 | * | 4/2001 | Lee ............................. 345/167 |
| 6,225,981 | B1 | * | 5/2001 | Lu .............................. 345/164 |
| 6,240,183 | B1 | * | 5/2001 | Marchant ..................... 380/28 |
| 6,304,249 | B1 | * | 10/2001 | Derocher et al. ........... 345/163 |
| 6,337,919 | B1 | * | 1/2002 | Dunton ........................ 382/124 |
| 6,362,440 | B1 | * | 3/2002 | Karidis et al. ........... 178/18.01 |
| 6,369,798 | B1 | * | 4/2002 | Yatsu et al. .................. 345/167 |
| 6,392,632 | B1 | * | 5/2002 | Lee ............................. 345/158 |
| 6,476,795 | B1 | * | 11/2002 | Derocher et al. ........... 345/163 |
| 6,492,975 | B1 | * | 12/2002 | Weiss ......................... 345/163 |
| 6,496,179 | B1 | * | 12/2002 | Toda ........................... 345/163 |
| 6,580,420 | B1 | * | 6/2003 | Wang ......................... 345/163 |

FOREIGN PATENT DOCUMENTS

| | | | | | |
|---|---|---|---|---|---|
| JP | 03-113624 | * | 5/1991 | ........... | G06F 3/033 |
| JP | 10-133813 | * | 5/1998 | ........... | G06F 3/033 |
| JP | 2001-034405 | * | 2/2001 | ........... | G06F 3/033 |

* cited by examiner

*Primary Examiner*—Bipin Shalwala
*Assistant Examiner*—Mansour M. Said

(57) ABSTRACT

A computer mouse includes a collapsible housing and an optical sensor within the housing. The housing may be collapsed into a relatively flat or compact structure. Once collapsed, the mouse may be stored in a compartment such as a PCMCIA slot of a notebook computer.

17 Claims, 4 Drawing Sheets

COLLAPSIBLE COMPUTER MOUSE

BACKGROUND OF THE INVENTION

The present invention relates generally to computer input/output devices. More specifically, the present invention relates to a computer mouse.

A computer mouse is a popular pointing device for desktop computers. The computer mouse is convenient to grasp, simple to move and easy to operate. With the flick of a wrist and the click of a button, an application can be launched, a function can be selected, text can be deleted or a line can be drawn.

While the computer mouse is a popular pointing device for desktop computers, it is not a popular pointing device for laptops and other portable computers. A typical computer mouse is relatively large and inconvenient to store and transport.

Instead, mobile computers are equipped with pointing devices such as track balls, track pads, and pointing sticks. Small in size, a track ball is easier to store and transport than a conventional mouse. Track pads and pointing sticks are usually integrated into notebook computers and, therefore, do not have to be stored.

Still, track balls, track pads and pointing sticks can be awkward to use. Certain applications such as drafting programs require precise and rapid movements of the pointing device. A mouse can deliver precise movements much more easily and much more rapidly than a pointing stick.

Reduced-size mice have been proposed for mobile computers. However, reducing the size of the mouse increases the difficulty in handling and controlling the mouse.

There is a need for a computer mouse that is convenient to handle and control, yet convenient to store and transport.

SUMMARY OF THE INVENTION

This need is met by the present invention. According to one aspect of the present invention, a collapsible computer mouse includes a collapsible housing. The collapsible mouse is as easy to handle and control as a conventional mouse. When the housing is collapsed, however, the collapsible mouse may be conveniently stored and transported. For example, the mouse may be collapsed and stored in a PCMCIA slot of a mobile computer.

Other aspects and advantages of the present invention will become apparent from the following detailed description, taken in conjunction with the accompanying drawings, illustrating by way of example the principles of the present invention.

DETAILED DESCRIPTION OF THE PREFERRED EMBODIMENTS

Figure 1:
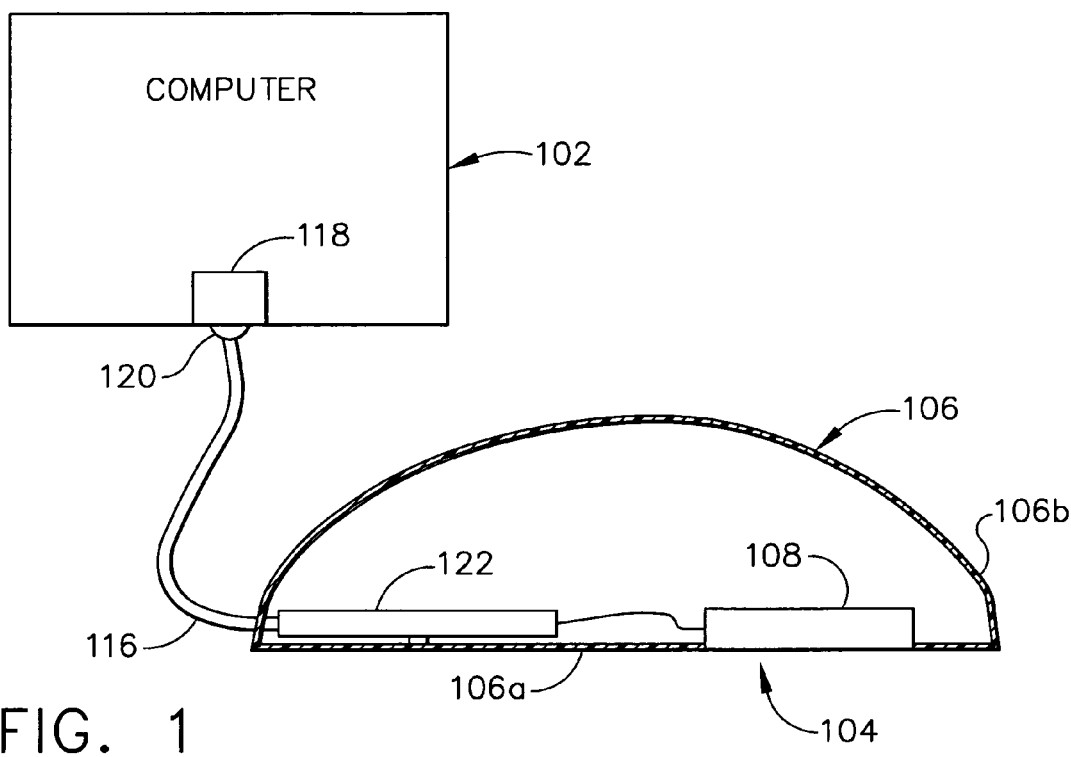
FIG. 1 is an illustration of a notebook computer and a first collapsible mouse.

As shown in the drawings for purposes of illustration, the present invention is embodied in a computer mouse having a collapsible housing. When the housing is collapsed, the collapsible mouse may be conveniently stored and transported. For example, the collapsed mouse may be stored in a PCMCIA slot of a mobile computer. During normal usage, when the housing is not collapsed, the collapsible mouse is as large as a conventional mouse. Therefore, the collapsible mouse is as easy to handle and control as a conventional mouse. It is easier to handle and control than small, finger-driven pointing devices.

FIG. 1 shows a notebook computer 102 and a collapsible mouse 104 for the notebook computer 102. The collapsible mouse 104 includes a collapsible housing 106 having a base 106a and an upper portion 106b that is secured to the base 106a. For example, the upper portion 106b may have a convex shape and may be attached to periphery of the base 106a. When not collapsed, the housing 106 may have the size and shape of a conventional mouse.

The base 106a may be made of a hard, relatively rigid plastic. An outer surface 106c of the base 106a may be coated with a material that allows sliding along a slidable surface (e.g., a mouse pad, a desk top). For example, the outer surface of the base 106a may be covered with "TEFLON" tape.

An optical sensor 108 is located within the housing 106. The optical sensor 108 includes an LED lamp, a lens and a sensor chip. The sensor chip, which may be an Application-Specific Integrated Circuit ("ASIC"), includes an embedded optical detector and an embedded processor. The lens covers a window in the base 106a. The sensor chip may be secured to the base 106a, with the detector being in alignment with the lens. The base 106a should be relatively rigid to maintain proper alignment between the lens and the detector. During operation, the LED lamp illuminates a portion of the slidable surface and the lens images the illuminated portion onto the detector. The detector detects a series of images (which should change as the mouse is moved), and the processor examines changes in the light patterns to determine a relative motion of the mouse 104. The processor generates a signal indicating the relative motion, the signal being in a mouse port format.

Figure 2:
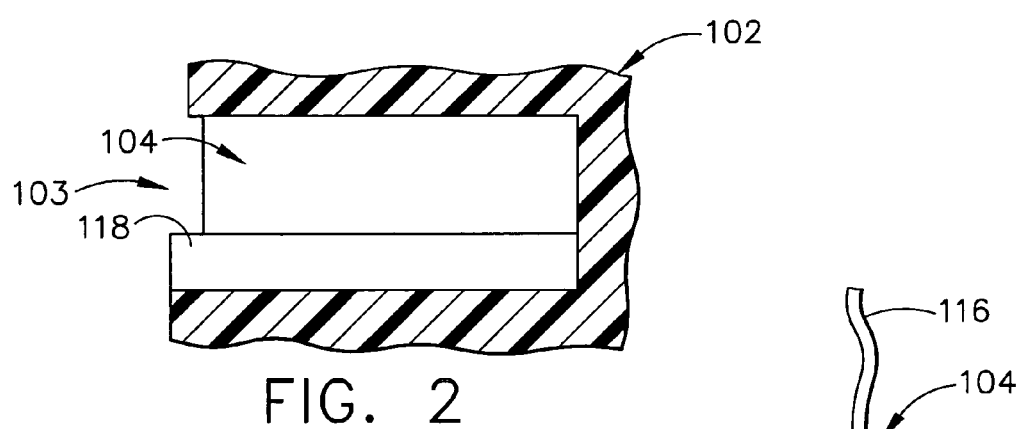
FIG. 2 is an illustration of the first collapsible mouse being stored in a first PCMCIA slot of the computer and a PCMCIA card located in a second PCMCIA slot of the computer.

The upper portion 106b of the housing 106 may be made of foam, hollow rubber, or other elastic material that can be compressed. A user may compress or collapse the mouse 104 by applying a downward force on the housing 106. The mouse 104 may be flattened and stored in briefcase or computer case, or the collapsed mouse 104 may be stored in a small compartment. The base 106a, optical sensor 108 and upper housing portion 106b may be made thin enough for the compressed mouse 104 to be squeezed inside a type I PCMCIA slot 103 of the notebook computer 102 (see FIG. 2).

When the mouse 104 is removed from storage, the elastic material returns to its original shape, whereby the housing 106 returns to its original shape. Thus, the mouse 104 may return to the size of a conventional mouse after compressive forces have been removed.

The hollow rubber or foam composition of the upper housing portion 106b makes the mouse 104 easy to grip. Thus, the collapsible mouse 104 can be as easy to handle and control as a conventional mouse.

Figure 3:
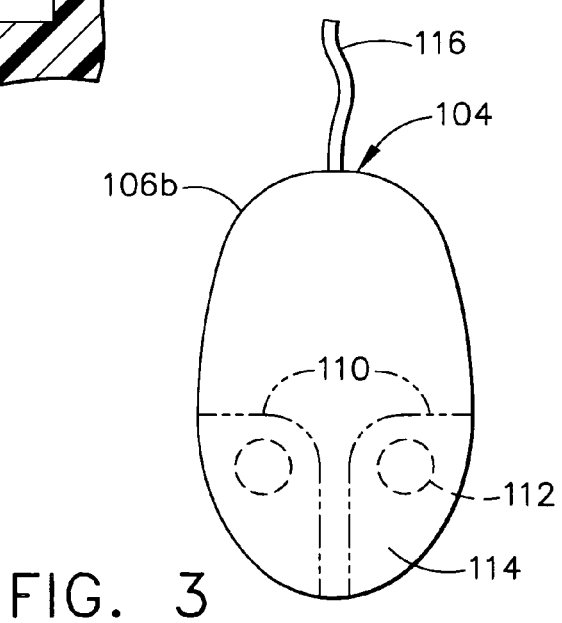
FIG. 3 is an illustration of an upper housing portion of the first collapsible mouse.

The upper housing portion 106b includes one or more "buttons." The buttons may be implemented in different ways. For example, outlines 110 of buttons may be drawn or silk-screened onto the upper housing portion 106b, and a sensor 112 may be embedded in the upper housing portion 106b, beneath each outlined area 108 (see FIG. 3). An output of each sensor 112 is supplied to the processor of the optical sensor 108. Pressing on an outlined area causes a deflection of the outlined area 114. The sensor 112 beneath the deflected area is sensitive enough to detect the deflection before the housing 106 is collapsed. When the deflection exceeds a threshold, the processor indicates (to the host) that a button has been clicked.

In the alternative, a one-button mouse may be implemented by placing a pressure sensor within the housing 106. When the upper housing portion 106b is "squeezed", the pressure sensor detects a change in air pressure within the housing 106. An output of the pressure sensor is supplied to the processor. When the pressure change exceeds a threshold, the processor indicates (to the host) that the button has been clicked. The pressure sensor may be fabricated on the sensor chip.

The mouse 104 may be connected to the computer via a cable 116 and PCMCIA card 118. The cable 116 may extend through an opening in the housing 106. A first end of the cable is connected to the sensor chip, and a second (other) end of the cable is adapted to be connected to the PCMCIA card 118. For example, the second end of the cable 116 may terminate into a flat connector 120 that can mate with a connector in the PCMCIA card 118.

The mouse 104 may also have a retractable cable assembly for retracting the cable 114 into the housing 106. The retractable cable assembly may include a spring-loaded reel 122 that is mounted to the base 106a. When the cable 116 is disconnected from the PCMCIA card 118, the reel 122 pulls the cable 116 into the housing 106. The housing opening may be sized and shaped such that the connector 120 nestles into the opening when the cable 116 is fully retracted into the housing 106. A lock or catch prevents the reel 122 from retracting the cable 114 while the mouse 104 is being used.

Figure 4A:
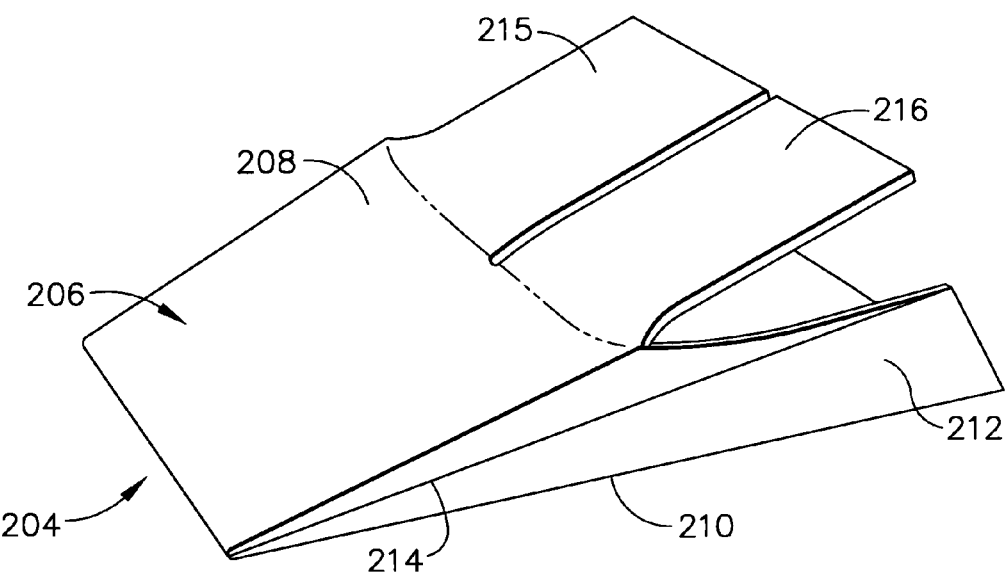
FIGS. 4A, 4B and 4C are illustrations of a second collapsible mouse.
Figure 4B:
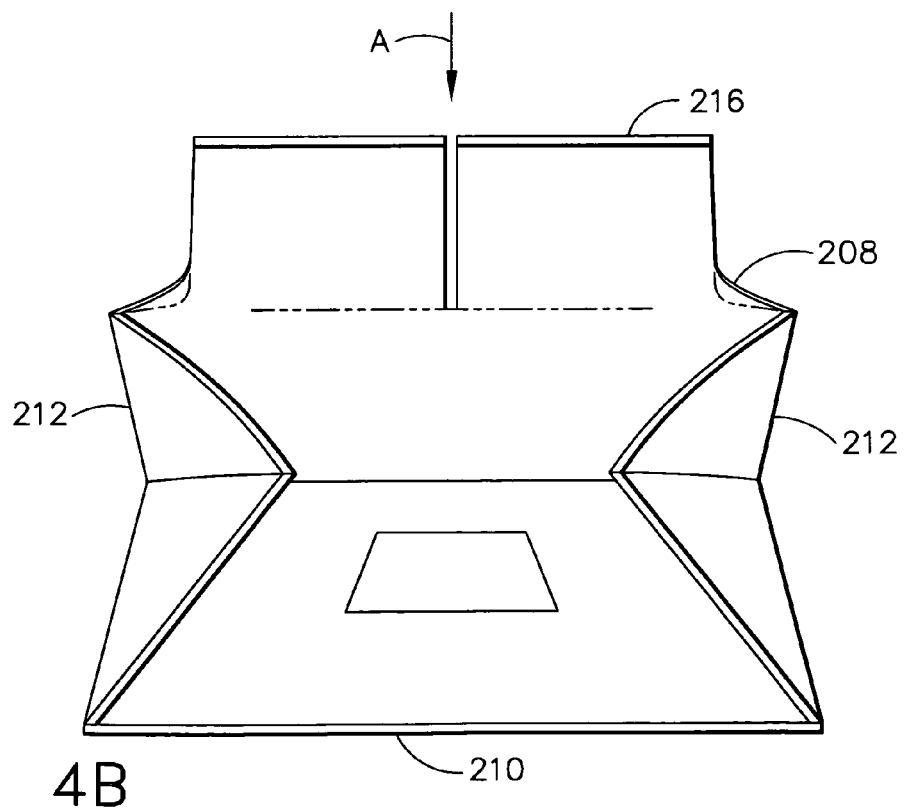
Figure 4C:
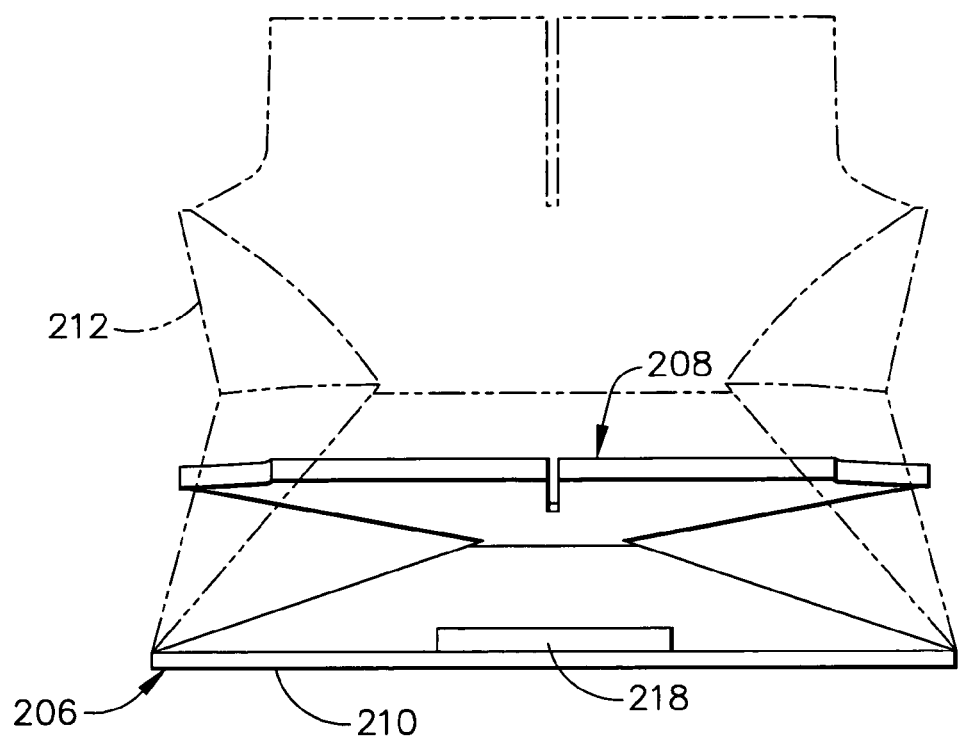

FIGS. 4A to 4C show a second collapsible mouse 204 having a collapsible housing 206. The housing 206 includes an upper portion 208, a base 210 and sidewalls 212 between the upper portion 208 and the base 210. The base 210 may have a rectangular in shape that fits into a PCMCIA slot of a computer. The upper housing portion 208 may also be generally rectangular in shape. The sidewalls 212 may give the housing 206 a box-like shape, or the sidewalls 212 may be tapered so the upper portion 208 can join the base 210 at the front of the housing 206 and thereby give the housing 206 more of a sleek shape.

Each side wall 212 has a fold line 214. When a downward force is applied to the upper portion 208 (as indicated by the arrow A), the sidewalls 212 fold inwardly at their fold lines 214, whereby the housing 206 collapses into a relatively flat structure (see FIG. 4c). The housing 206 returns to its original shape when the applied force is removed.

The housing 206 of the second mouse 204 may be formed from a single sheet of a relatively stiff resilient sheet plastic material. In the alternative, the housing 206 may be formed from multiple plates.

An optical sensor 218 is located within the housing 206. A lens of the optical sensor covers a window in the base 210. The base 210 should be relatively rigid to keep the lens and detector in alignment.

A pair of soft strips 215 and 216 are cantilevered from the upper housing portion 208. These strips 215, 216 function as buttons. A small sensor (not shown) is provided for each button. Each sensor may detect the amount of bend in its corresponding strip 215, 216. An output of each sensor is supplied to the processor of the sensor chip. The amount of bend indicates whether a button has been actuated.

The second mouse 204 may communicate with a host (e.g., a notebook computer) using wireless techniques. A wireless transmitter may be used to transmit mouse information to a host. The transmitter may be powered by a flat battery. The transmitter may be included in the sensor chip of the optical sensor 218.

If the host has an infrared ("IR") receiver, the transmitter may be an IR transmitter that transmits data according to a well known IrDA specification.

The transmitter may instead be a radio frequency ("RF") transmitter that transmits data according to a standard such as the Bluetooth RF specification. A PCMCIA card may include an RF receiver for receiving the transmitted mouse data. Thus, the RF transmitter would communicate with a host via the PCMCIA card.

Figure 5:
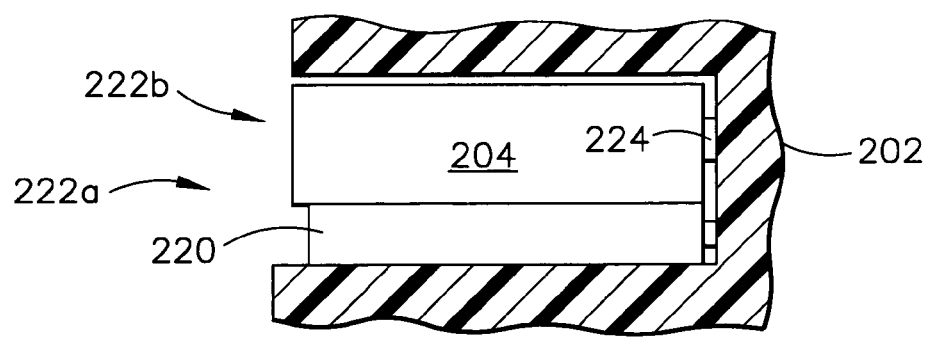
FIG. 5 is an illustration of the second collapsible mouse being stored in a first PCMCIA slot of a computer and a PCMCIA card located in a second PCMCIA slot.

Reference is now made to FIG. 5, which shows the PCMCIA card 220 in a first slot 222a of a notebook computer. FIG. 5 also shows the second mouse 202 collapsed and stored in a second slots 222b.

The second mouse 204 may have a PCMCIA connector 224 that can mate with a connector in the PCMCIA slot 222a. PCMCIA slot connectors are usually powered by the battery of the host 202. Thus, the mouse battery can be charged by the host battery while the mouse 202 is being stored in the PCMCIA slot.

In the alternative, the second mouse 204 may plug in directly to the PCMCIA card 220. Circuitry for charging the mouse is included in the mouse 204 or the PCMCIA card 220.

The PCMCIA card 220 may be full-sized or half-sized. However, a half-sized PCMCIA card 220 allows more room for the mouse to be stored.

Thus disclosed is a collapsible mouse that is convenient to store and transport, yet as easy to handle and control as a conventional mouse. The collapsible mouse is easier to handle and control than small, finger-driven pointing devices that are commonly used in mobile computers.

The collapsible mouse is not limited to use with notebooks and other mobile computers. The collapsible mouse may be used as a pointing device for desktop computers and any other type of computer systems.

Certain features of the first mouse may be used by the second mouse, and vice versa. For example, the first mouse may include a transmitter and battery instead of a retractable cable.

The flat connector may be connected to the PCMCIA card, or it may be connected to a port of the computer. Such a computer port may have a proprietary format.

The cable connector is not limited to the low-profile connector described above. It may instead be a standard connector such as a PS/2 connector, a serial connector or a Universal Serial Bus ("USB") connector. The standard connector would connect directly to a computer port (e.g., a PS/2 port, a serial port or a USB port).

Instead of using a retractable cable, a cable that plugs into the mouse may be used. For example, a USB cable may be plugged into the collapsible mouse. In such an instance, the mouse would be provided with a connector port.

Figure 6B:
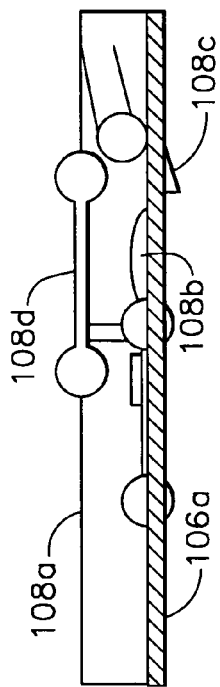
FIGS. 6A and 6B are illustrations of an optical sensor in deployed and stowed positions.
Figure 6A:
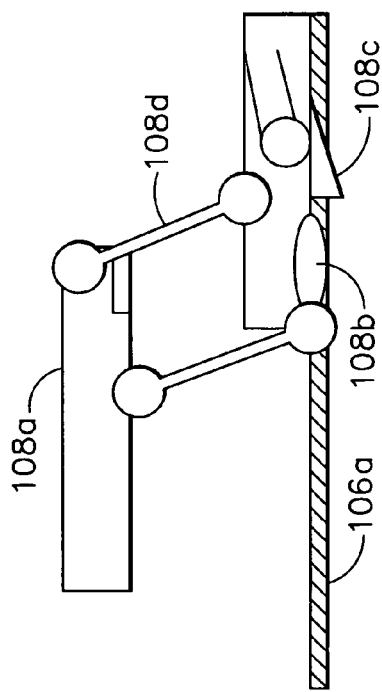

Referring to FIGS. 6A and 6B, the profile of the optical sensor 108 may be reduced when the housing 106 is collapsed. The profile of the optical sensor 108 may reduced by moving the sensor chip 108a between a deployed position and a stowed position. In the deployed position (FIG. 6A), the detector of the sensor chip 108a is aligned with the lens 108b. In the stowed position (FIG. 6B), the sensor chip 108a rests on the housing base 106a. The lens 108b and lamp 108c remain in fixed positions. Hinges 108d may be used to move the sensor chip 108a between the deployed and stowed positions. The hinges 108d may be spring-biased towards the deployed position. However, the same force that collapses the housing 106 also moves the sensor chip 108a towards the stowed position.

Figure 7B:
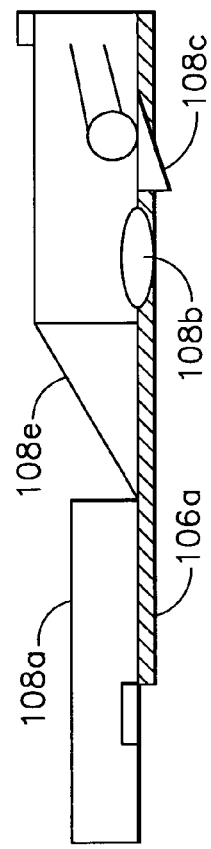
FIGS. 7A and 7B are illustrations of an optical sensor in deployed and stowed positions.
Figure 7A:
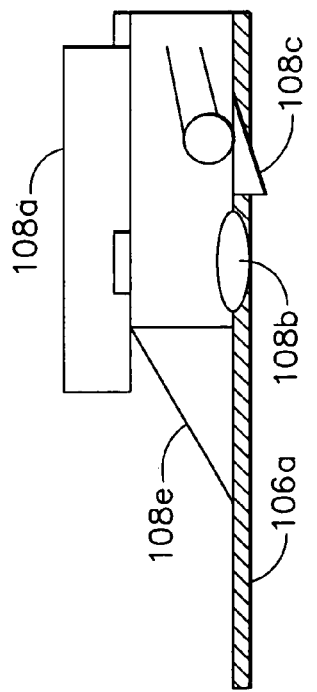

FIGS. 7A and 7B show an alternative approach to reducing the profile of the optical sensor 108. The sensor chip 108a may be moved up a ramp 108e to the deployed position (FIG. 7A) and down the ramp 108e to the stowed position (FIG. 7B).

The collapsible mouse is not limited to optical sensors. The collapsible mouse may use any other motion sensor having a low profile.

The invention is not limited to the specific embodiments described above. Instead, the invention is construed according to the claims that follow.

What is claimed is:

1. A computer mouse comprising:
   a motion sensor; and
   a collapsible housing for the motion sensor, the mouse sized to fit within a PCMCIA slot when the housing is fully collapsed.

2. The mouse of claim 1, further comprising a retractable cable assembly within the housing.

3. The mouse of claim 1, further comprising a transmitter within the housing.

4. The mouse of claim 1, further comprising a PCMCIA connector mounted to the housing.

5. A computer mouse comprising:
   a motion sensor; and
   a collapsible housing for the motion sensor, the collapsible housing including a rigid base and an upper portion attached to the base, the upper portion made entirely of an elastic material that is flattened by application of a downward force toward the base and that returns to its original shape when the downward force is removed.

6. The mouse of claim 5, wherein the housing is collapsible into a relatively flat structure.

7. The mouse of claim 5, wherein the motion sensor includes an optical sensor.

8. The mouse of claim 5, further comprising a sensor within the housing, wherein changes in volume of the housing correspond to mouse clicks, and wherein the sensor detects the changes in housing volume; whereby the detected chances indicate mouse clicks.

9. A computer mouse comprising:
   a motion sensor; and a collapsible housing for the motion sensor, the collapsible housing including a resilient plastic sheet that defines outer housing walls that are foldable about fold lines to allow the housing to collapse into a relatively flat structure when a downward force is applied the housing returning to its original shape when the downward force is removed.

10. The mouse of claim 9, wherein the resilient plastic sheet further defines a top portion and a base; and wherein the foldable walls are inwardly-folding sidewalls between the top portion and the base.

11. A computer mouse comprising:
    a motion sensor;
    a collapsible housing for the motion sensor, wherein the collapsible housing includes a rigid base and an upper portion attached to the base, the upper portion made of an elastic material that allows the housing to be collapsed; and wherein the housing has a deflectable mouse button area; and
    at least one sensor for detecting when the area is deflected; whereby deflecting the area corresponds to clicking a mouse button.

12. A computer mouse comprising:
    a motion sensor;
    a collapsible housing for the motion sensor, the collapsible housing including a resilient plastic sheet having fold lines that allow the housing to collapse into a relatively flat structure;
    a bendable strip cantilevered from the housing; and
    a sensor for detecting when the strip is bent; whereby bending the strip corresponds to clicking a mouse button.

13. A computer mouse comprising
    a motion sensor including a sensor chip; and
    a collapsible housing for the motion sensor;
    the sensor chip movable between a stowed position and a deployed position.

14. The mouse of claim 13, wherein the motion sensor also includes a lens, and wherein the sensor chip is moved relative to the lens when the housing is collapsed.

15. A combination comprising a mouse including a collapsible housing, the mouse sized to fit within a PCMCIA slot when the housing is fully collapsed; and a PCMCIA card for communicating with the mouse.

16. The combination of claim 15, further comprising a flat battery within the housing and a battery charger within one of the mouse and the PCMCIA card.

17. The combination of claim 15, further comprising a portable computer having first and second PCMCIA slots, the mouse sized to fit in one of the PCMCIA slots.

* * * * *